United States Patent [19]

Haeusler et al.

[11] 3,940,073

[45] Feb. 24, 1976

[54] APPARATUS FOR WRAPPING A COMPOUND-CURVED CONDUCTOR BAR

[75] Inventors: Jochen Haeusler, Nurnberg-Laufamholz; Manfred Schmirl; Dietmar West, both of Nurnberg, all of Germany

[73] Assignee: Siemens Aktiengesellschaft, Munich, Germany

[22] Filed: Sept. 12, 1974

[21] Appl. No.: 505,257

[30] Foreign Application Priority Data

Sept. 18, 1973  Germany............................ 2346965

[52] U.S. Cl. .................. 242/7.08; 57/10; 156/425; 242/7.23
[51] Int. Cl.² ..................... H01F 11/04; D02G 3/36
[58] Field of Search........ 242/7.06, 7.08, 7.21–7.22, 242/7.23; 156/425, 428, 422, 430, 431, 443, 468; 57/10, 13; 53/203

[56] References Cited
UNITED STATES PATENTS

| | | | |
|---|---|---|---|
| 2,666,283 | 1/1954 | Dearborn...................... | 242/7.21 X |
| 3,378,427 | 4/1968 | McClean............................ | 156/431 |
| 3,616,061 | 10/1971 | Carter................................ | 242/7.23 |
| 3,853,667 | 12/1974 | Polshikov........................... | 156/422 |

Primary Examiner—Edward J. McCarthy
Attorney, Agent, or Firm—Kenyon & Kenyon Reilly Carr & Chapin

[57] ABSTRACT

An apparatus is described for wrapping a compound-curved conductor bar. It includes a winding head which is provided with a motor-driven winding ring equipped with rolls carrying insulating tape. According to the invention, the revolving winding ring is held in five degrees of freedom. For purposes of positioning it relative to the compound-curved conductor bar to be wrapped, the winding ring is adjustable in three orthogonal coordinate directions and can be tilted about two mutually orthogonal axes. The winding head carries a sensing device for measuring its change of position relative to the conductor bar to be wrapped and furnishing correction signals.

11 Claims, 7 Drawing Figures

3,940,073

APPARATUS FOR WRAPPING A COMPOUND-CURVED CONDUCTOR BAR

BACKGROUND OF THE INVENTION

1. Field of the Invention

The invention concerns generally apparatus for wrapping insulation about a conductor bar and particularly, compound-curved conductor bars.

2. Description of the Prior Art

Windings of large electric machines are frequently constructed from coils or bars with rectangular cross section. The quality of the insulation of the coils or bars is a parameter important to the overall quality of the machine. Typically, the insulation of the windings is accomplished by means of tapes of insulating material which are wound on a supply reel and which are wound, at least one layer thick, onto the bars or coils in spiral fashion, with prescribed overlap as well as with sufficient tension.

The wrapping of such conductor bars was formerly done, generally, by hand. A skilled winder was able to adapt to the strength properties of different composite insulating materials by feel. He could also adjust himself to the different geometries of the bars to be insulated. The quality of the insulation was therefore dependent on the craftsman-like skill and the experience of the worker. Of course, his output, because of the relative slowness of the method was low. For this reason, motor-driven devices were developed, which resulted in considerably higher speeds.

One of these automated devices was designed to wrap straight sections of bars. It consists, of a winding head which carries a winding ring equipped with supply rolls carrying one or several insulating tapes. The winding ring revolves during the wrapping with a speed of rotation which depends on the feeding velocity of the work piece. It is guided so that its axis of rotation coincides with the axis of the bar. During the wrapping operation, the winding head is guided parallell to the bar axis. The tension, with which the insulating material can be worked, can be adjusted by means of special devices at the supply or guide rolls. Such arrangements for wrapping electric conductor bars with insulating material are not suited, however, for compound-curved conductor bars, since they cannot follow the curvature.

As far as compound-curved bars are concerned, auxilary devices such as templates, guide bars or other duplicating devices have been used to substantially align the axis of the winding ring with the center line of the bar. Such auxiliary devices, however, must be prepared specially for each bar or coil shape. Further these devices do not completely guarantee that the axis of the winding ring is coincident with the center line of the bar for the full length thereof. An occasional tilting of the winding head by additional control mechanism is therefore necessary. Such winding machines offer a suitable approach where a sufficiently large number of coils or bars of the same shape are to be insulated. This condition, however, applies rarely in the construction of large machines, where the number of conductor bars with the same shape is small. The use of templates or duplicating devices is therefore uneconomical in these special cases, not only because of the preparation of the respective bars, cams and the like, but also because of the relatively high expense of storing them. This is not inconsiderable when one considers the dimensions of windings common in the construction of large machines.

The duplicating and/or template method also has an inherent disadvantage in that they assume a conductor bar or a coil has been made ideally as far as the geometric dimensions are concerned. However, as a practical matter this is not always the case, particularly with the present, manual fabricating methods. With increasing size of the conductor bars, this becomes more of a problem. This fact also makes a duplicating method employing computer "software", such as a prepunched tape, as a template somewhat impractical.

Another known technique uses the conductor bar itself as the template, guiding the winding head along the bar with positive contact. This arrangement, however, results in increased mechanical stress of the insulation, which typically is not designed therefore. This is particularly true of the lower layers, in the case of compound-curved conductor bars. This problem arises due to the fact that the heavy windng head is supported by the insulating tapes. In addition to the static load, acceleration forces come into play. The advancing of the winding head, particularly in the region of inclinations, causes additional stresses on the insulating material.

It is therefore a primary object of this invention to provide an apparatus for winding a curved-conductor bar which avoids many of the disadvantages of known devices.

SUMMARY OF THE INVENTION

The apparatus described is suitable for wrapping aa compound-conductor bar. It includes a winding head which is provided with a motor-driven winding ring equipped with rolls carrying insulating tape. According to the invention, the revolving winding ring is held in five degrees of freedom. For purposes of positioning it relative to the compound-curved conductor bar to be wrapped, the winding ring is adjustable in three orthogonal coordinate directions and can be tilted about two mutually orthogonal axes. The winding head carries a sensing device for measuring its change of position relative to the conductor bar to be wrapped and furnishing correction signals.

For wrapping the compound-curved conductor rod, the winding ring is adjusted so that its axis of rotation is aligned in the direction of the center line of the bar. The origin of the coordinate system is situated likewise on the center line of the bar. The motion of the winding ring is in the lengthwise direction of the bar, so that the origin of the coordinate system remains on the center line during the advancing motion of the winding head. Several positioners are provided, which are operated either electrically, pneumatically or hydraulically by means of control signals. Since the winding ring is held, for the purpose of positoning it, in five degrees of freedom, it can always be positioned by the sensing device so that its winding plane is perpendicular to, and the winding axis coincides with, the center line of the bar to be wrapped.

According to an additional feature of the invention, the sensing device consists of two sensing systems arranged in two planes parallel to the winding plane of the winding ring. Each of these has two mutually orthogonal measuring sections containing at least one sensor, where each sensor determines the position of the conductor bar within a measuring section and converts it into an electric signal. The sensing device is connected to evaluation logic. The sensing device enables the winding head or the winding ring to always follow accurately such that the axis of rotation of the winding ring is tangential to the center line of the conductor bar during the wrapping.

Due to the fact that the sensing device consists of two sensing systems arranged in two planes parallel to the winding plane and the position of the center line within the winding ring is determined only within these planes, in the case where the winding ring is passing a curved portion of the bar, taking into consideration the unavoidable hysteresis, the positioners locate the winding ring in an interval about the center line of the conductor bar. However, the deviations caused thereby are small and do not lead to a degradation of the quality of the wrapping.

BRIEF DESCRIPTION OF THE DRAWINGS

Reference is now made to the accompanying drawings for a better understanding of the nature and objects of the invention. The drawings illustrate the best mode presently contemplated for carrying out the objects of the invention and its principles, and they are not to be construed as restrictions or limitations on its scope. In the drawings.

DESCRIPTION OF THE PREFERRED EMBODIMENT

Figure 1:
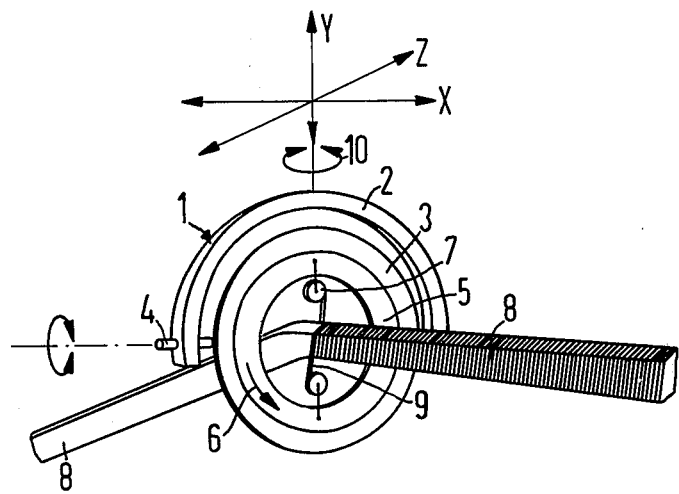
FIG. 1 is a schematic, perspective view of the winding head of the invention relative to the bar to be wrapped.

FIG. 1 shows the principle of the winding head pictorially. The winding head, generally designated with 1, consists of a gimbal yoke 2, in which a guide ring 3 is rotatably mounted at pivot 4. In this guide ring, the winding ring 5 is pivoted so that it can rotate in the direction of the arrow 6. The winding ring rotates around the conductor bar 8 which is to be wrapped with insulating material 9. For this purpose, the winding ring 5 carries several supply rolls 7 containing the insulating material. The winding head is movably supported in five degrees of freedom. In the present case the winding head can be positioned in the directions of the three orthogonal coordinates X, Y and Z. The positioners are not shown here. The winding ring can furthermore be rotated about the Y-axis as shown by arrow 10, as well as about its Z axis. The axes of rotation of course, are orthogonal.

Figure 2:
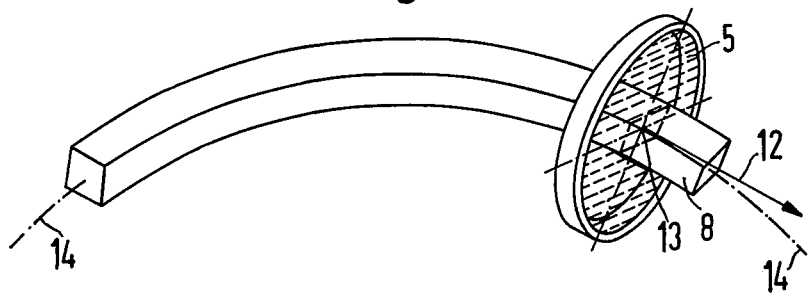
FIG. 2 is a schematic representation of the winding and conductor bar useful in understanding the invention.

As shown in FIG. 2, the winding head or the winding ring is to be controlled and guided in such a manner that the axis of rotation 12 of the winding ring 5 at the winding location 13 in question is tangent to the trajectory of center line 14 of the compound-curved conductor bar 8.

Figure 3:
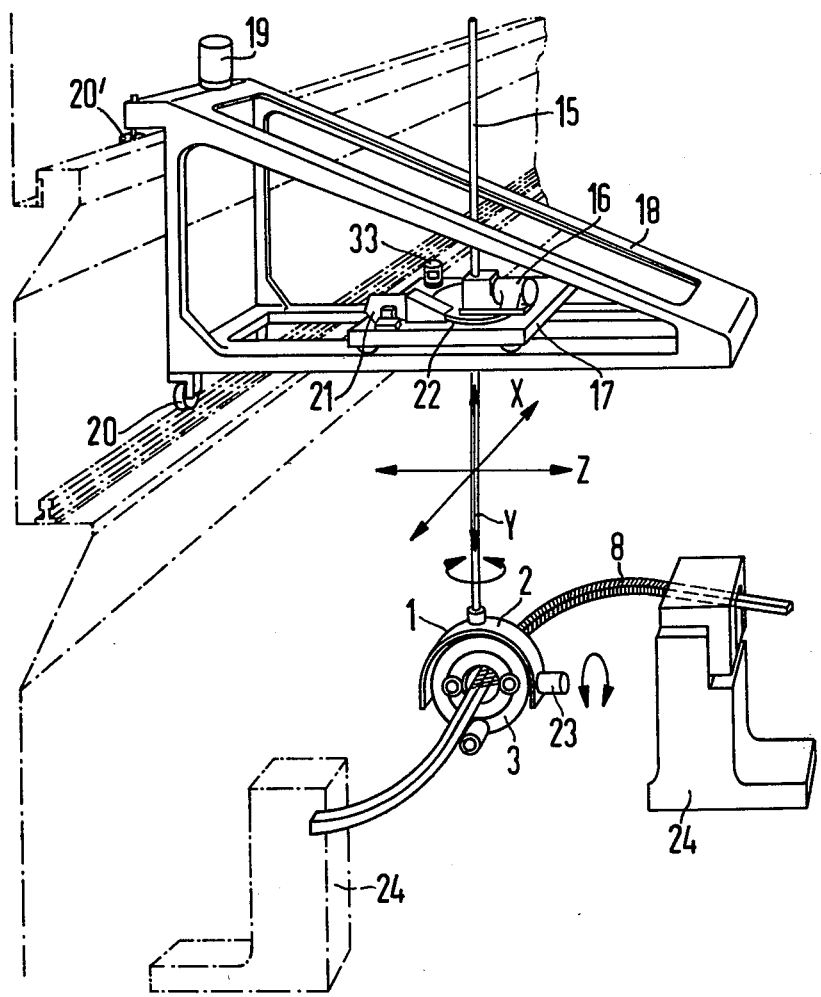
FIG. 3 is a perspective view of the complete apparatus of the invention shown winding a curved-conductor bar.

Apparatus for the implementation of the method is shown in FIG. 3. The winding head is mounted here on a lifting rod 15, which is supported and adjustable in height, in the direction of the Y-axis according to FIG. 1, by means of a positioning motor and lifting device 16. This lifting device is mounted on a trolley 17. The lifting rod and thus the winding head 1 can be positioned along the Z axis by it.

The trolley is supported in a gantry bracket 18. The latter is supported on tracks 20, 20' so that it can be positioned and moved by means of a positioning motor 19 in the X-direction.

The tilting motion of the winding head 1 about the Y-axis is accomplished by a tiling and positioning motor 21 located on the trolley 17. This rotates a turntable 22 upon which is mounted the lifting device 16. A further positioning motor 23 is mounted at the yoke 2 of the winding head 1 and serves to rotate the guide ring 3 about its Z axis in a known manner. The bar to be wrapped 8 is held in place by suitably positioned clamping supports 24.

During the wrapping, the axis of rotation of the winding ring follows the center line of the bar to be wrapped, as shown in FIG. 2. For this purpose, the guide ring has a sensing device which makes possible automatic guidance of the winding head or the winding ring.

Figure 4:
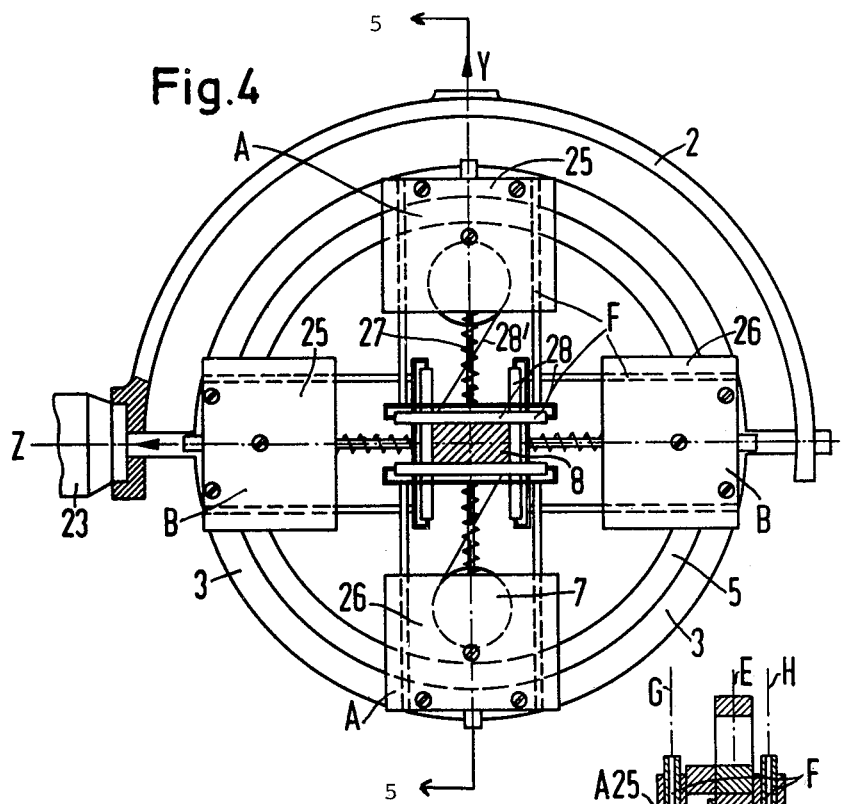
FIG. 4 is an elevation view of the sensing head portion of the invention.
Figure 5:
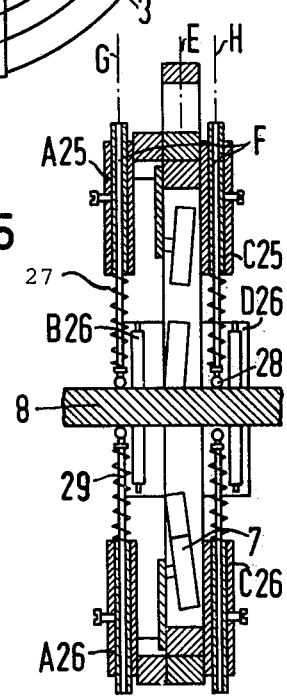
FIG. 5 is a sectional view taken along lines 5–5 of FIG. 4.

FIGS. 4 and 5 show a sensing device, generally designated as F, which makes it possible to guide the winding ring automatically along the center line of a compound-curved conductor bar. To determine the relative deviation of the bar from the center of the winding ring, it would be sufficient to carry out a measurement in only one plane as close as possible to the winding point. The curvature of the bar, however, could not be sensed. Therefore the invention provides for making the measurement in two planes G, H, extending parallel to the winding plane E — where these planes are located as close as possible to the winding plane.

In the present example, the guide ring carries four measuring systems, A to D. Each of these consist of two diametrically opposite inductive distance transducers, for example 25 and 26. These distance transducers are mounted on the guide ring 3. The movable core 27 of each distance transducer is connected with a roll 28, and spring 28' serving to push this roll against the bar to be wrapped 8. The two measuring systems A and C supply the positioning signals for the winding ring in the Y-direction. Similar signals for controlling the winding ring in the Z-direction are supplied by the measuring systems B and D.

In another embodiment of the invention, it is provided to use contactless distance transducers, e.g., optical distance transducers, instead of the mechanically operated sensors. Such measuring systems are known per se and each consist of a light source as the radiation emitter and a light receiver which may contain a diode cell.

Figure 6:
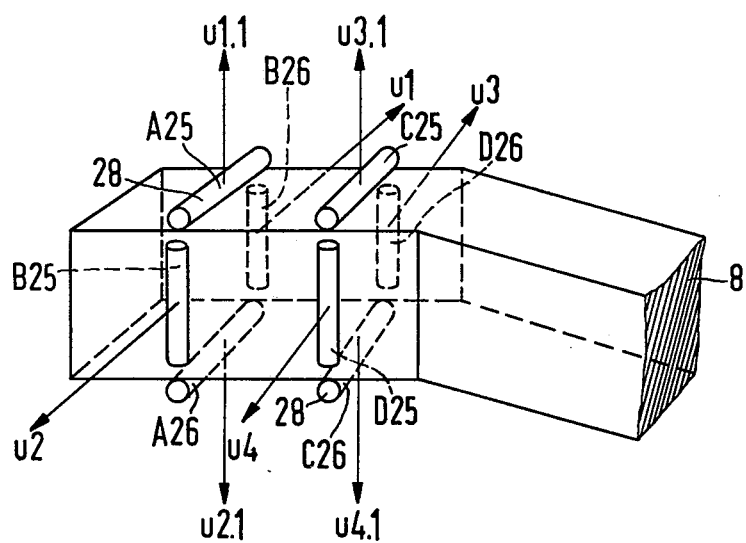
FIG. 6 is a schematic view useful in understanding the operation of the sensing device portion of the invention.
Figure 7:
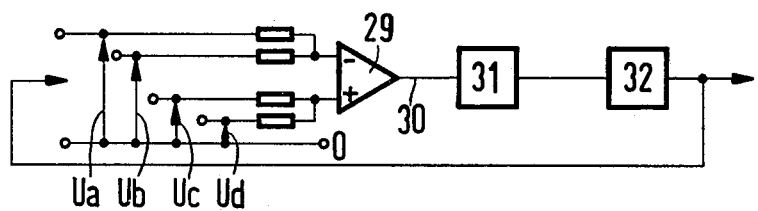
FIG. 7 is a schematic view of the electronic circuitry for processing information from the sensing head transducers.

The operation of the sensing device can be seen from FIGS. 6 and 7. The eight distance transducers (B25 and B26, D25 and D26, A25 and A26 as well as C25 and C26) furnish analog voltages ($u1$ to $u4$ and $u1.1$ to $u4.1$) proportional to the distance of the winding ring from the center line of the bar 8.

In order to determine deviations of the bar in the Z-direction from the center of the winding ring, the voltages $u1, u2, u3$ and $u4$ must be combined as follows:

$$(u1 + u3) - (u2 + u4) = \Delta Z'.$$

For the deviation in the Y-direction one has similarly $$(u1.1 + u3.1) - (u2.1 + u4.1) = \Delta Y'.$$

To fulfill the second requirement, namely, that the winding plane is perpendicular to the center line, one obtains the following equations:

For the rotation about the Y-axis $$(u1 + u4) - (u2 + u3) = wY';$$

For the rotation about the Z-axis $$(u1.1 + u4.1) - (u2.1 + u3.1) = wZ'.$$

The correction signals obtained through the equations above are fed to the respective positioning motors as control signals.

FIG. 7 shows a circuit preferably used for the combining of the signals. There is one circuit for each of the controlled quantities, i.e., $\Delta Z'$, $\Delta Y'$ and $wY'$, and $WZ'$. For determining the controlled variable $\Delta Z'$, the voltage $\mu 1$ is applied across terminals $Ua$; the voltage $u3$ to $Ub$, the voltage $u2$ to $Uc$ and, finally, the voltage $u4$ to $Ud$. For determining the other controlled variables, a similar circuit would be used. Thus, for the controlled variable $\Delta Y'$, the following voltages would be in the same order $u1.1, u3.1, u2.1, u4.1$; for $wy'$, $u1, u4, u2, u3$; for $wZ'$, $u1.1, u4.1, u2.1, u3.1$. As shown, these voltages are applied to two inputs of operational amplifier 29. These two voltages are summed at each input and their sums subtracted from each other at the output. The difference voltage appearing at the output 30 of the operational amplifier is amplified in an output amplifier 31 to the power level of the respective positioner, e.g., the positioning motor 33, for setting the z-direction. The positioners are driven in an appropriate direction such that the respective differences at the preamplifier 29 become zero.

Network 32 is a suitable reactive network necessary for stabilizing the loop formed by the electronics shown in FIG. 7, the positioning motor and the sensing heads. Its design would be well known to those in the art given the gain and frequency response characteristics of the various elements in the loop.

Within the scope of the invention, it is also possible to convert the analog signals $\Delta Y'$, $\Delta Z'$, $wY'$ and $wZ'$ into digital signals and to thus drive the positioning motors by means of positioning pulses. The cost of the electronics is larger in this case, but it has the advantage that the positioning motors can always be operated with constant voltage, so that the positioning hysteresis can be kept small.

Other variations of the embodiment described above would be readily apparent to those skilled in the art. The embodiment described is not to be construed as a limitation on the breadth of the invention. The invention must only be restricted by the allowable scope of the attached claims.

What is claimed is:

1. An apparatus for wrapping a compound-curved conductor bar with insulation material which comprises:
   a. a winding head including,
      i. a guide ring,
      ii. a winding ring supported by said guide ring, said winding ring adapted to revolve within said guide ring,
      iii. at least one roll, for carrying said insulation material, positioned on said winding ring, and
      iv. sensing means, positioned on said winding head, for measuring the change of position of said winding head relative to said conductor bar to thereby provide correctional signals proportional to the relative position between the two; and
   b. means responsive to said correctional signals for adjusting the position of said winding ring such that the plane of said winding ring is maintained substantially perpendicular to the center line of said bar.

2. The apparatus of claim 1 wherein the means for adjusting the position of said winding ring include means for adjusting its position is three orthogonal coordinate directions and means for tilting said winding ring about two of said three orthogonal directions.

3. The apparatus of claim 1 wherein said sensing means comprises two sensing systems, each system arranged in a parallel plane of said winding ring, each system comprising:
   a. a first measuring means for detecting the change of position of said bar, relative to said winding ring, along one of said coordinate axes; and
   b. a second measuring means for detecting the change of position of said bar, relative to said winding ring, along a second of said coordinate axes; said first and second measuring means each comprising at least one sensor, said sensor providing an electrical correctional signal proportional to the respective change of position detected.

4. The apparatus of claim 3 wherein said means responsive to said electrical correctional signals comprise:
   a. a plurality of positioning motors; and
   b. electronic circuitry responsive to said electrical correctional signals to thereby provide a plurality of electrical signals of sufficient power to drive respective ones of said positioning motors.

5. The apparatus of claim 1 wherein said winding head further includes a gimbal yoke, said guide ring pivotally mounted within said yoke.

6. The apparatus of claim 5 further comprising:
   a. a gantry;
   b. a trolley positioned in said gantry and adapted, to move within said gantry along a line parallel to one coordinate axis of said winding ring;
   c. a turntable positioned on said trolley;
   d. means for rotating said turntable about a second coordinate axis of said winding ring; and
   e. a lifting rod colinear with said second coordinate axis and connecting said gimbal yoke to said turntable, said lifting rod transmitting the rotational movement of said turntable to said gimbal yoke.

7. The apparatus of claim 6 further comprising:
a track system, said gantry including means for moving said gantry on said track system in a direction parallel to a third coordinate axis of said winding ring; said turntable including means for moving said lifting rod linearly along said second coordinate axis; said trolley including means for moving said trolley along said first coordinate axis.

8. The apparatus of claim 7 further comprising a motor for pivoting said guide ring within said gimbal yoke about said one coordinate axis.

9. The apparatus of claim 3 wherein said first and second measuring means each includes two diametrically opposite, inductive distance transducers.

10. The apparatus of claim 3 wherein said first and second measuring means each includes two diametrically opposite, optical distance transducers.

11. The apparatus of claim 4 wherein said first and second measuring means each comprise two sensors diametrically disposed on either side of said bar, and wherein said electronic circuitry responsive to said electrical correctional signals comprises a plurality of circuits each including:
 a. an operational amplifier responsive to four of said electrical correctional signals;
 b. a power amplifier for raising the power level of the output of said operational amplifier; and
 c. means, responsive to respective outputs of said power amplifiers for positioning said winding ring, such that the plane of said winding ring is maintained substantially perpendicular to the center line of said bar.

* * * * *

UNITED STATES PATENT AND TRADEMARK OFFICE
CERTIFICATE OF CORRECTION

PATENT NO. : 3 940 073
DATED : February 24, 1976
INVENTOR(S) : Jochen Haeusler et al It is certified that error appears in the above-identified patent and that said Letters Patent are hereby corrected as shown below:

Column 2, line 32, change "wrapping aa" to --wrapping a--.

Column 2, line 56, change "positoning" to --positioning--.

Column 4, line 16, change "tiling" to --tilting--.

Column 5, line 27, change "These" to --There--.

Signed and Sealed this

Twentieth Day of July 1976

[SEAL]

Attest:

RUTH C. MASON
*Attesting Officer*

C. MARSHALL DANN
*Commissioner of Patents and Trademarks*